United States Patent
Ju et al.

(10) Patent No.: US 6,201,244 B1
(45) Date of Patent: Mar. 13, 2001

(54) BOLOMETER INCLUDING AN ABSORBER MADE OF A MATERIAL HAVING A LOW DEPOSITION-TEMPERATURE AND A LOW HEAT-CONDUCTIVITY

(75) Inventors: Sang-Baek Ju; Yoon-Joong Yong, both of Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/146,256

(22) Filed: Sep. 3, 1998

(51) Int. Cl.⁷ .................................................. H01L 31/09
(52) U.S. Cl. .................................. 250/338.1; 250/338.4; 338/18
(58) Field of Search ............................... 250/338.1, 332, 250/338.4; 338/15, 18, 17

(56) References Cited

U.S. PATENT DOCUMENTS

| | | | |
|---|---|---|---|
| 5,021,663 | * | 6/1991 | Hornbeck ............................. 250/349 |
| 5,286,976 | * | 2/1994 | Cole .................................... 250/349 |
| 5,397,897 | * | 3/1995 | Komatsu et al. ................. 250/338.4 |
| 5,404,125 | * | 4/1995 | Mori et al. ............................ 338/18 |
| 5,572,029 | | 11/1996 | Walker et al. . |
| 5,629,521 | * | 5/1997 | Lee et al. ......................... 250/338.1 |
| 5,760,398 | * | 6/1998 | Blackwell et al. .................. 250/332 |
| 5,789,753 | * | 8/1998 | Gooch et al. ........................ 250/349 |
| 5,811,815 | * | 9/1998 | Marshall et al. ................ 250/370.06 |
| 5,939,971 | * | 8/1999 | Yong ..................................... 338/15 |
| 6,028,312 | * | 2/2000 | Wadsworth et al. ................. 250/351 |
| 6,034,374 | * | 3/2000 | Kimura et al. .................. 250/370.08 |

FOREIGN PATENT DOCUMENTS 0534768    3/1993   (EP) .

OTHER PUBLICATIONS

International Search Report Apr. 9, 1999.

* cited by examiner

*Primary Examiner*—Constantine Hannaher
(74) *Attorney, Agent, or Firm*—Pennie & Edmonds LLP

(57) ABSTRACT

A three-level infra-red bolometer includes an active matrix level, a support level, a pair of posts and an absorption level. The active matrix level includes a substrate having an integrated circuit, a pair of connecting terminals and a protective layer covering the substrate. The support level includes a pair of bridges, each of the bridges being provided with a conduction line formed on top thereof, wherein one end of the conduction line is electrically connected to the respective connecting terminal. The absorption level includes a serpentine bolometer element surrounded by an absorber made of silicon oxide ($SiO_2$) or silicon oxy-nitride ($SiO_xN_y$). Each of the posts includes an electrical conduit surrounded by an insulating material and is placed between the absorption level and the bridge, in such a way that the serpentine bolometer element is electrically connected to the integrated circuit through the electrical conduit, the conduction line and the connecting terminal.

5 Claims, 4 Drawing Sheets

BOLOMETER INCLUDING AN ABSORBER MADE OF A MATERIAL HAVING A LOW DEPOSITION-TEMPERATURE AND A LOW HEAT-CONDUCTIVITY

FIELD OF THE INVENTION

The present invention relates to an infra-red bolometer; and, more particularly, to a three-level infra-red bolometer including an absorber made of a material having a low deposition-temperature and a low heat-conductivity.

BACKGROUND OF THE INVENTION

Bolometers are energy detectors based upon a change in the resistance of materials (called bolometer elements) that are exposed to a radiation flux. The bolometer elements have been made from both metals and semiconductors. In case of the metals, the resistance change is essentially due to a variation in the carrier mobility, which typically decreases with temperature. In contrast, greater sensitivity can be obtained in high-resistivity semiconductor bolometer elements wherein the free-carrier density is an exponential function of temperature; however, thin film fabrication of semiconductor elements for the construction of bolometers is a difficult task.

In FIGS. 1 and 2, there are shown a perspective view and a cross sectional view illustrating a three-level bolometer 100, disclosed in U.S. application Ser. No. 09/102,364 entitled "BOLOMETER HAVING AN INCREASED FILL FACTOR". The bolometer 100 comprises an active matrix level 110, a support level 120, at least a pair of posts 170 and an absorption level 130.

The active matrix level 110 has a substrate 112 including an integrated circuit (not shown), a pair of connecting terminals 114 and a protective layer 116. Each of the connecting terminals 114 made of a metal is located on top of the substrate 112. The protective layer 116 made of, e.g., silicon nitride ($SiN_x$), covers the substrate 112. The pair of connecting terminals 114 are electrically connected to the integrated circuit.

The support level 120 includes a pair of bridges 140 made of silicon nitride ($SiN_x$), each of the bridges 140 having a conduction line 165 formed on top thereof. Each of the bridges 140 is provided with an anchor portion 142, a leg portion 144 and an elevated portion 146, the anchor portion 142 including a via hole 152 through which one end of the conduction line 165 is electrically connected to the connecting terminal 114, the leg portion 144 supporting the elevated portion 146.

The absorption level 130 is provided with a serpentine bolometer element 185 made of titanium (Ti), an absorber 195 made of silicon nitride ($SiN_x$) and an IR absorber coating 197 formed on top of the absorber 195. The absorber 195 is fabricated by depositing silicon nitride before and after the formation of the serpentine bolometer element 185 to surround the serpentine bolometer element 185.

Each of the posts 170 is placed between the absorption level 130 and the support level 120. Each of the posts 170 includes an electrical conduit 172 made of a metal, e.g., titanium (Ti), and surrounded by an insulating material 174 made of, e.g., silicon nitride ($SiN_x$). Top end of the electrical conduit 172 is electrically connected to one end of the serpentine bolometer element 185 and bottom end of the electrical conduit 172 is electrically connected to the conduction line 165 on the bridge 140, in such a way that both ends of the serpentine bolometer element 185 in the absorption level 130 is electrically connected to the integrated circuit of the active matrix level 110 through the electrical conduits 172, the conduction lines 165 and the connecting terminals 114. When exposed to infra-red radiation, the resistivity of the serpentine bolometer element 185 changes, causing a current and a voltage to vary, accordingly. The varied current or voltage is amplified by the integrated circuit, in such a way that the amplified current or voltage is read out by a detective circuit (not shown).

There are certain deficiencies associated with the above described three-level bolometer 100. When selecting the material for the absorber 195, it is important to consider the fabrication conditions, e.g., deposition-temperature, and the material characteristics, e.g., heat-conductivity. In the above described three-level bolometer 100, since silicon nitride ($SiN_x$) can be formed only at a relatively high temperature, e.g., over 850° C., titanium (Ti) constituting the serpentine bolometer element 185 gets easily oxidized during the formation of the absorber 195, which will, in turn, detrimentally affect the temperature coefficient of resistance (TCR) thereof. Further, silicon nitride ($SiN_x$) has a relatively high heat-conductivity, reducing the thermal isolation effect of the absorber 195 in the bolometer 100.

SUMMARY OF THE INVENTION

It is, therefore, a primary object of the present invention to provide a three-level infra-red bolometer including an absorber made of a material that can be formed at a low temperature and has a low heat-conductivity.

In accordance with one aspect of the present invention, there is provided a three-level infra-red bolometer, which comprises: an active matrix level including a substrate and at least a pair of connecting terminals; a support level provided with at least a pair of bridges, each of the bridges including an conduction line, one end of the conduction line being electrically connected to the respective connecting terminal; an absorption level including a bolometer element formed between an upper absorber and a lower absorber, the absorbers being made of silicon oxide or silicon oxy-nitride; and at least a pair of posts, each of the posts being placed between the absorption level and the support level and including an electrical conduit surrounded by an insulating material, each end of the bolometer element of the absorption level being electrically connected to the respective connecting terminal through the respective electrical conduit and the respective conduction line.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

Figure 1:
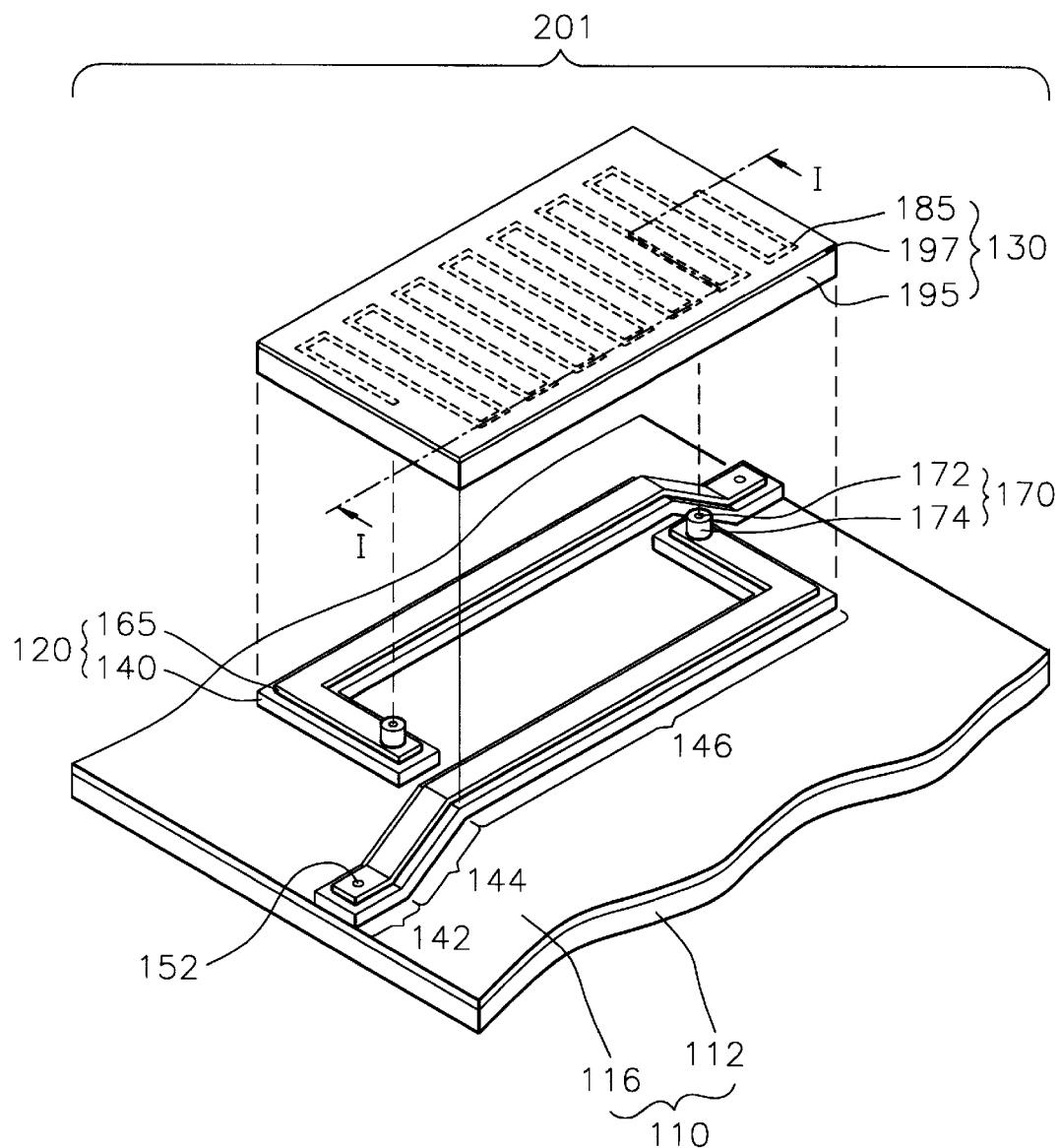
FIG. 1 shows a perspective view setting forth an infra-red bolometer previous disclosed.
Figure 2:
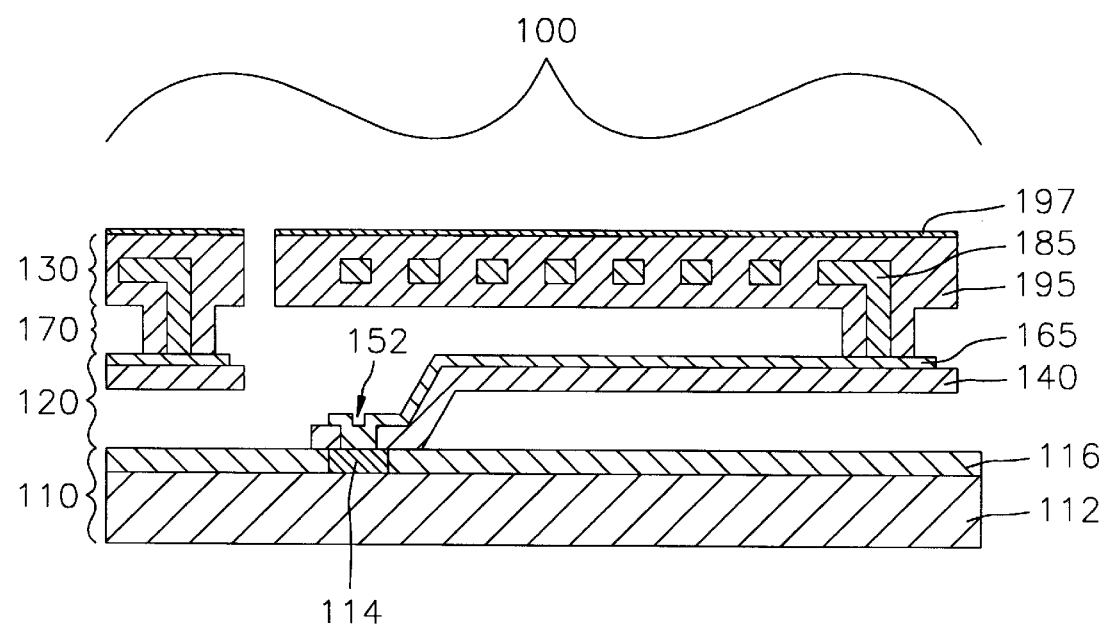
FIG. 2 present a schematic cross sectional view depicting the infra-red bolometer shown in FIG. 1.
Figure 3:
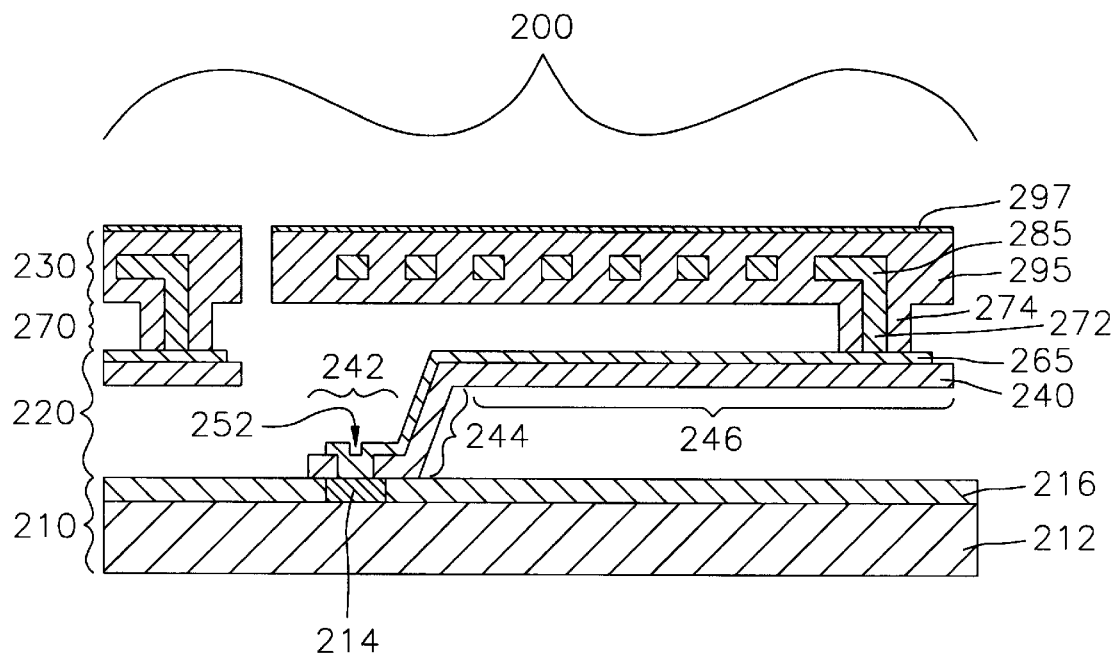
FIG. 3 depicts a schematic cross sectional view setting forth a three-level infra-red bolometer in accordance with the present invention.
Figure 4A:
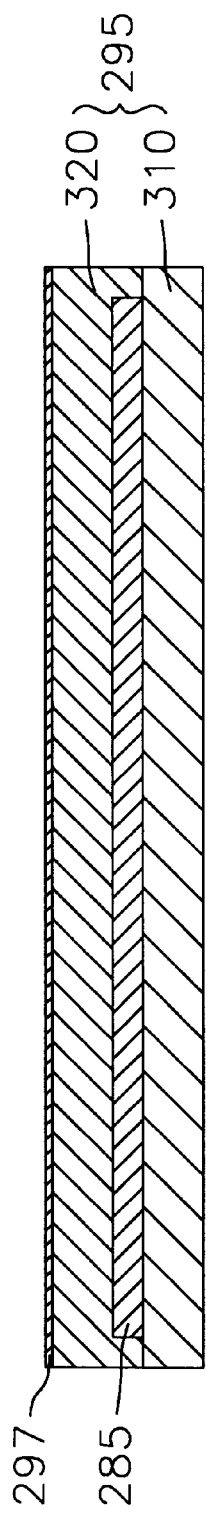
FIGS. 4A to 4B provide schematic cross sectional views depicting an absorption level in accordance with two preferred embodiments of present invention, respectively.
Figure 4B:
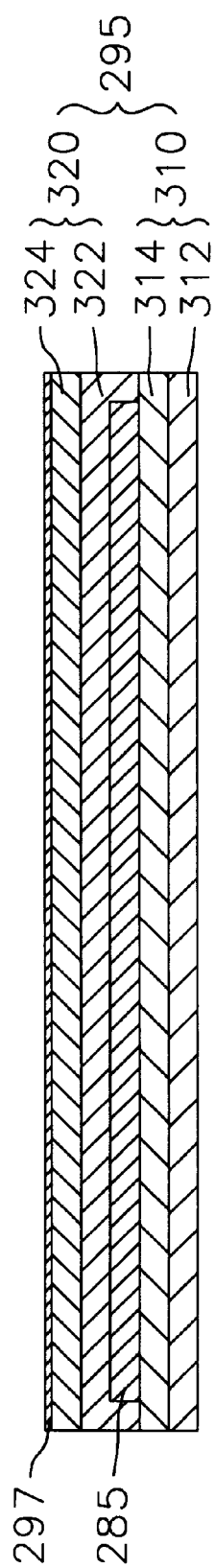

There are provided in FIGS. 3 and 4A to 4B a schematic cross sectional view setting forth a three-level infra-red bolometer 200 and schematic cross sectional views of an absorption level therein in accordance with two embodiments of the present invention, respectively. It should be noted that like parts appearing in FIGS. 3 and 4A to 4B are represented by like reference numerals.

The inventive bolometer 200 shown in FIG. 3 comprises an active matrix level 210, a support level 220, at least a pair of posts 270 and an absorption level 230.

The active matrix level 210 has a substrate 212 including an integrated circuit (not shown), a pair of connecting terminals 214 and a protective layer 216. Each of the connecting terminals 214 made of a metal is located on top of the substrate 212. The pair of connecting terminals 214 are electrically connected to the integrated circuit. The protective layer 216 made of, e.g., silicon nitride ($SiN_x$) covers the substrate 212.

The support level 220 includes a pair of bridges 240 made of an insulating material, e.g., silicon oxide ($SiO_2$) or silicon oxy-nitride ($SiO_xN_y$), each of the bridges 240 having a conduction line 265 formed on top thereof. Each of the bridges 240 is provided with an anchor portion 242, a leg portion 244 and an elevated portion 246, the anchor portion 242 including a via hole 252 through which one end of the conduction line 265 is electrically connected to the connecting terminal 214, the leg portion 244 supporting the elevated portion 246.

The absorption level 230 is provided with an absorber 295 made of an insulating material, a serpentine bolometer element 285 made of a metal, e.g., titanium (Ti), and an IR absorber coating 297 positioned on top of the absorber 295.

The table below provides the deposition-temperature and heat-conductivity for the materials that can be used as the material for the absorber 295.

| material | deposition-temperature(° C.) | heat-conductivity (W/m · ° C.) |
|---|---|---|
| $SiN_x$ | 850 | 19 |
| $SiO_2$ | 200 | 1.3–1.8 |
| $SiO_xN_y$ | 300 | 10.1–10.4 |

As shown in the above table, silicon oxide ($SiO_2$) and silicon oxy-nitride ($SiO_xN_y$), respectively, has a lower heat-conductivity and a deposition-temperature than those for silicon nitride ($SiN_x$).

In the first embodiment of present invention, the absorber 295 includes a lower part 310 and an upper part 320 which are made of an insulating material, e.g., silicon oxide ($SiO_2$) or silicon oxy-nitride ($SiO_xN_y$), as shown in FIG. 4A.

As shown in FIG. 4B, a second embodiment is similar to the first embodiment, except that an upper and a lower parts 310, 320 consist of two layers. The lower part 310 includes a first lower portion 312 made of silicon oxy-nitride ($SiO_xN_y$) and a second lower portion 314 made of silicon oxide ($SiO_2$). The upper part 320 includes a first upper portion 322 made of silicon oxide ($SiO_2$) and a second upper portion 324 made of silicon oxy-nitride ($SiO_xN_y$).

Each of the posts 270 is placed between the absorption level 230 and the support level 220. Each of the post 270 includes an electrical conduit 272 made of a metal, e.g., titanium (Ti) and surrounded by an insulating material 274 made of, e.g., silicon nitride ($SiN_x$). Top end of the electrical conduit 272 is electrically connected to one end of the serpentine bolometer element 285 and bottom end of the electrical conduit 272 is electrically connected to the conduction line 265 on the bridge 240, in such a way that both ends of the serpentine bolometer element 285 in the absorption level 230 is electrically connected to the integrated circuit of the active matrix level 210 through the electrical conduits 272, the conduction lines 265 and the connecting terminals 214. When the infra-red energy is absorbed, the resistivity of the serpentine bolometer element 285 is increased, in such a way that the increased resistivity is read out by a detective circuit (not shown).

In the three-level infra-red bolometer 200 of the present invention, the absorber 295 is made of a material having a relatively low heat conductivity and low deposition temperature, e.g., siliconoxide ($SiO_2$) or silicon oxy-nitride ($SiO_xN_y$). The low deposition temperature will prevent the bolometer element from getting oxidized during the formation thereof and the low conductivity will increase the thermal isolation effect of the absorber 295, which will, in turn, facilitate in ensuring an optimum performance of the bolometer 200, e.g., a responsivity, a detectivity and a noise equilibrium temperature difference (NETD).

While the present invention has been described with respect to certain preferred embodiments only, other modifications and variations may be made without departing from the scope of the present invention as set forth in the following claims.

What is claimed is:

1. A three-level infra-red bolometer comprising:
   an active matrix level including a substrate and at least a pair of connecting terminals;
   a support level provided with at least a pair of bridges, each of the bridges including a conduction line, one end of the conduction line being electrically connected to the respective connecting terminal;
   an absorption level including an upper absorber, a lower absorber and a bolometer element formed between the upper and the lower absorbers, wherein the lower absorber including a first lower portion made of $SiO_xN_y$ and a second lower portion made of $SiO_2$, and the upper absorber including a first upper portion made of $SiO_2$ and a second upper portion made of $SiO_xN_y$; and
   at least a pair of posts, each of the posts being placed between the absorption level and the support level and including an electrical conduit surrounded by an insulating material, each end of the bolometer element of the absorption level being electrically connected to the respective connecting terminal through the respective electrical conduit and the respective conduction line.

2. The bolometer of claim 1, wherein the bridges are made of $SiO_2$ or $SiO_xN_y$.

3. The bolometer of claim 1, wherein the absorption level further includes an IR absorption coating.

4. The bolometer of claim 1, wherein the bolometer element is made of titanium.

5. In a three-level infra-red bolometer, the improvement comprising:
   an absorption level including an upper absorber part, a lower absorber part and a bolometer element formed between the upper and the lower part, wherein the lower part includes a first lower portion made of $SiO_xN_y$ and a second lower portion made of $SiO_2$, and the upper part includes a first upper portion made of $SiO_2$ and a second lower portion made of $SiO_xN_y$.

* * * * *